United States Patent [19]

Nishimatsu et al.

[11] 4,330,439
[45] May 18, 1982

[54] ELECTRIC DEVICE COMPRISING IMPREGNATED INSULATING MATERIALS AND ELECTRIC ELEMENTS

[75] Inventors: Mineaki Nishimatsu, Kyoto; Sadayoshi Mukai, Katano; Yoshinori Hayashi, Ohtsu; Osamu Yamaguchi, Takatsuki; Akira Ito; Nobuo Ahiko, both of Iwaki, all of Japan

[73] Assignees: Kureha Kagaku Kogyo Kabushiki Kaisha, Tokyo; Nissin Electric Co., Ltd., Kyoto, both of Japan

[21] Appl. No.: 201,930

[22] Filed: Oct. 29, 1980

[30] Foreign Application Priority Data

Nov. 8, 1979 [JP] Japan ................................. 54-145125
Nov. 8, 1979 [JP] Japan ................................. 54-145126

[51] Int. Cl.$^3$ ............................................ H01F 27/10
[52] U.S. Cl. .................................. 252/570; 252/571; 252/567; 585/6.3; 585/6.6; 585/426; 174/25 C; 336/94; 338/80; 361/327
[58] Field of Search ................. 252/570, 571; 585/6.3, 585/6.6, 426; 174/176 P; 336/94; 338/80; 361/327

[56] References Cited

U.S. PATENT DOCUMENTS 3,611,225 10/1971 Dakin ................................. 252/570

FOREIGN PATENT DOCUMENTS 50-47195 4/1975 Japan ................................. 585/6.6
2032950 5/1980 United Kingdom ................. 585/6.3

*Primary Examiner*—Mayer Weinblatt
*Attorney, Agent, or Firm*—Wegner & Bretschneider

[57] ABSTRACT

The electric device according to the present invention has as its constituents the insulating materials and elements comprising films of synthetic resin, for instance, polypropylene, impregnated with 1-phenyl-2-ethylphenylethane and/or 1-phenyl-2-isopropylphenylethane.

According to the present invention, insulating oils having favorable compatibility with the film of synthetic resin such as polypropylene and favorable affinity to metals and having low viscosity have been provided, and in addition, electric devices excellent in properties of withstanding a high voltage and dielectric properties in a broad range of temperature from a low temperature to a high temperature have also been offered.

10 Claims, 2 Drawing Figures

ELECTRIC DEVICE COMPRISING IMPREGNATED INSULATING MATERIALS AND ELECTRIC ELEMENTS

BACKGROUND OF THE INVENTION (1) Field of the Invention

The present invention concerns electric devices. More particularly, the present invention concerns electric devices such as capacitors and cables having as its components electric elements comprising insulating paper and synthetic resin films or synthetic resin films which have been impregnated with 1-phenyl-2-ethylphenylethane and/or 1-phenyl-2-isopropylphenylethane.

(2) Description of the Prior Art

Higherto, in electric devices such as transformers, cables and capacitors, mineral oil has been conventionally used as an insulating oil. However, because of high viscosity and high pour point of the mineral oil as well as its poor property to withstand higher voltages, the miniaturization of the above-mentioned electric devices has come to its limit. Accordingly, for the improvement of the property of withstanding high voltages of such electric devices, various insulating oils have been developed.

As synthetic insulating oils, several types of compounds have been proposed such as those of diarylalkane type, alkylnaphthalene type, etc. Prior art which discloses the diarylalkane type used also in the present invention is shown, for instance, in Japanese Patent Publication No. 1642/80. This prior art discloses as a diarylalkane type insulating oil, 1-phenyl-1-ethylphenylethane, 1-phenyl-1-isopropylphenylethane and 1-phenyl-1-xylylethane, which are of 1,1-diarylethane type. Among them, 1-phenyl-1-xylylethane (hereinafter referred to as 1,1-PXE) has recently been put into practical use. Although a 1,1-diarylethane-type compound, for instance, 1,1-PXE has an improved property of withstanding higher voltages as compared to mineral oil, its affinity to metals is not favorable. Incidentally, copper and lead-alloys such as solder are the metals indispensable to such impregrated electric devices. An insulating oil which has poor affinity to these metals shorten the life of the oil-impregnated electric device. Because in the case where such oil is brought into contact with the above-mentioned metals, the dielectric loss of the oil is raised with the result in increasing the dielectric loss of the oil-impregnated insulating element.

Moreover, since dielectric loss is directly proportional to the calorific value of a dielectric substance, the increase of dielectric tangent means the loss of electric energy as thermal energy. This phenomenon is not favorable also from the view point of economization of energy.

In recent years, plastic films have come to be largely utilized as dielectrics in order to reduce the dielectric loss of the electric device containing the dielectrics and to improve their properties of withstanding high voltage. Accordingly, with respect to the insulating oil for use in these electric devices, other than its properties of withstanding high voltages and its excellent affinity to metals, it is further required that the oil should not dissolve or swell such plastic film and it should have a low viscosity. The process of impregnation of such electric devices with oils is the easier as the viscosity of the oil is the lower and thus air void in such electric devices becomes less. The property of withstanding high voltage is enhanced because of the smaller amount of air void as well as the improved circulation of the oil between the layers of films in the electric devices in operation.

SUMMARY OF THE INVENTION

An object of the invention is to provide an oil-impregnated electric device which is excellent in dielectric strength (i.e. withstands a high voltage) and durability.

Another object of the invention is to provide an insulating oil having an excellent dielectric strength and good compatibility with metals and synthetic resin films.

The other objects and features of the invention will be apparent from the following description.

The objects of the invention can be achieved by oil-impregnating the electric element, especially the element comprising synthetic resin films, contained in an electric device with an insulating oil selected from 1-phenyl-2-ethylphenylethane, 1-phenyl-2-isopropylphenylethane and the mixtures thereof.

BRIEF EXPLANATION OF DRAWING

In Drawing.

DETAILED DESCRIPTION OF THE INVENTION

Figure 1:
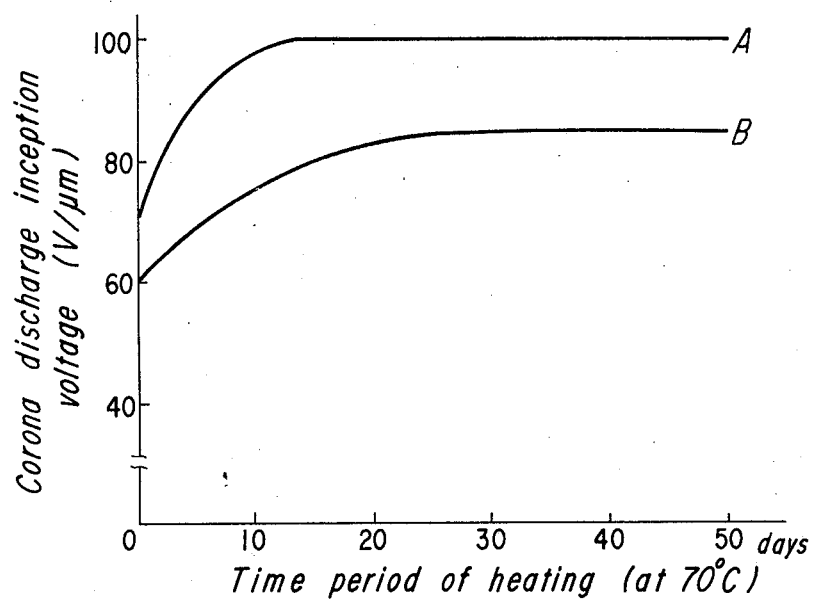
FIG. 1 shows the relationship between the corona (or partial) discharge inception voltage of the capacitor and the time period of heating a condenser in the all-film type capacitor impregnated with 1,2-EDE, 1,2-CPE, and 1,1-PXE, respectively.

The 1,2-diarylethane-type compounds for use in the present invention as the insulating oil, that is, 1-phenyl-2-ethylphenylethane (hereinafter referred to as 1,2-EDE) and 1-phenyl-2-isopropylphenylethane (hereinafter referred to as 1,2-CPE) are represented by the general formula:

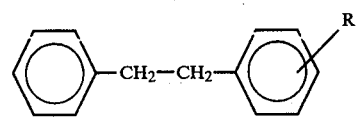

wherein R is an ethyl- or isopropyl group.

On the other hand, the chemical structure of a 1,1-diarylethane-type compound, that is, 1,1-PXE mentioned before, is as follows:

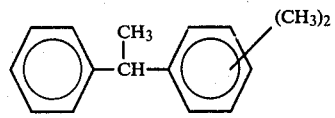

The difference between the chemical structures of the 1,2-type diarylethane and 1,1-type diarylethane is that the 1,1-type diarylethane has a tertiary carbon atom in the aliphatic chain connecting the two benzene rings; whereas, the 1,2-type diarylethane does not have such a tertiary carbon atom. According to our findings, the presence or absence of the above-mentioned tertiary carbon atom has a great influence on the dielectric properties of the insulating oils and consequently those of the resulting electric devices, although the chemical structures of those of 1,1-diarylethane- and 1,2-diarylethane types are very similar. As will be more precisely described later, in the case where 1,2-EDE and/or 1,2-CPE of the present invention is (are) used as the insulating oil instead of the conventional diarylethane of 1,1-type, the defects of the electric element in which a diarylethane of 1,1-type is used can be eliminated. The above-mentioned 1,2-EDE or 1,2-CPE can be used alone as the insulating oil; however, also the mixtures thereof may be used.

In addition, conventional additives, for instance, an antioxidant, may be admixed with the insulating oil of the present invention.

The specific properties of 1,2-EDE and 1,2-CPE are shown in Table 1 together with those of 1,1-PXE which has been recently put into practical use as an insulating oil, for reference.

TABLE 1

Properties of Synthetic Insulating Oils

| Properties | Insulating Oil | | |
|---|---|---|---|
|  | 1,2-EDE | 1,2-CPE | 1,1-PXE |
| Specific gravity | 0.971 | 0.963 | 0.988 |
| Flash point (°C.) | 148 | 154 | 148 |
| Pour point (°C.) | −67.5 | −65.0 | −47.5 |
| Viscosity (cst) at |  |  |  |
| 30° C. | 4.1 | 5.4 | 6.5 |
| 0° C. | 9.2 | 10.5 | 22.3 |
| −20° C. | 33 | 35 | 75 |
| −40° C. | 145 | 170 | 1870 |
| Visible gas generating voltage (V/μ) | 81 | 81 | 78 |
| Dielectric constant at 80° C. and 60 Hz. | 2.45 | 2.44 | 2.49 |

As will be understood from Table 1, 1,2-EDE and 1,2-CPE used in the present invention are superior to 1,1-PXE in their viscosity, pour point and visible gas generating voltage. The fact that the visible gas generating voltages of 1,2-EDE and 1,2-CPE are higher than that of 1,1-PXE means that the first two withstand higher voltage than 1,1-PXE.

Compatibilities of the above-mentioned compounds with polypropylene film are shown in Table 2.

TABLE 2

| Compatibility | Compatibility with Polypropylene Film | | |
|---|---|---|---|
| presented by | Insulating Oil | | |
|  | 1,2-EDE | 1,2-CPE | 1,1-PXE |
| Swelling of the film (% by weight) | 1.4 | 1.4 | 2.9 |
| Amount of the film dissolved in the oil (% by weight) | 0.06 | 0.06 | 0.10 |

The data shown in Table 2 are those obtained by immersing polypropylene film into each insulating oil at a temperature of 80° C. for 30 days, and swelling of the film shows the rate of weight increase of the film due to sorption of the oil and amount of the film dissolved in the oil shows the weight ratio of decrement of the film to the original film due to dissolution.

In the capacitor comprising films of synthetic resin, the absence of swelling of the film in the insulating oil means the prevention of the state of oil-deficiency within the film layers and the easy circulation of the oil between the film layers, which results in the improvement of the property of withstanding high voltage.

Also the smaller solubility means the improvement of the circulation of the oil between the film layers because of the prevention of the increase in viscosity of the oil.

Accordingly, it will be understood that the compatibility of 1,2-EDE or 1,2-CPE with polypropylene film is excellent.

In addition, the smaller viscosity of an insulating oil means the larger effect of removing the heat evolved within an electric device by convection.

Moreover, each of 1,2-EDE and 1,2-CPE of 1,2-diarylethane type compounds according to the invention has superior affinity to metals, particularly to solder and copper used in the electric elements as compared to compounds of 1,1-diarylethane type such as 1-phenyl-1-ethylphenylethane (hereinafter referred to as 1,1-EDE), 1-phenyl-1-isopropylphenylethane (hereinafter referred to as 1,1-CPE) and 1,1-PXE which has been recently put into practical use. The above-mentioned metals are indispensable in electric devices, where the metals act as a binding material between metals and as the capacitor. The influences of these metals on each of the above-mentioned insulating oils, particularly on dielectric tangent, are shown in Table 3. The data shown in Table 3 are those obtained after heating for 10 days each 200 ml of an insulating oil together with 0.5 g of solder or 5 g of copper in a sealed glass ampoule under nitrogen atmosphere at a temperature of 80° C.

TABLE 3

| | Dielectric Loss | | |
|---|---|---|---|
| Insulating oil | Dielectric loss of Insulating Oil tan δ (%) | | Metal |
|  | without metal | Solder | Copper |
| 1,2-type |  |  |  |
| 1,2-EDE | 0.01 | 0.02 | 0.02 |
| 1,2-CPE | 0.01 | 0.02 | 0.02 |
| 1,1-type |  |  |  |
| 1,1-PXE | 0.01 | 0.45 | 0.13 |
| 1,1-EDE | 0.01 | 0.43 | 0.11 |
| 1,1-CPE | 0.01 | 0.42 | 0.12 |

As is clearly seen in Table 3, the insulating oils of 1,1-diarylethane type are inferior to those of 1,2-diarylethane type with respect to compatibility with metals. It means the poor affinity to metals presumably due to the presence of the tertiary carbon atom on the carbon chain connecting two benzene rings mentioned before.

The electric elements comprising films of synthetic resin include those comprising film(s) of synthetic resin, and those comprising films of synthetic resin and insulating paper. The film of synthetic resin is the plastic film usually used in conventional electric insulating materials, and preferably is a polyolefin film such as a film of polyethylene or polypropylene, polyester film and polyvinylidene fluoride film, particularly preferable one being polypropylene film. A preferable polyester is poly(ethylene terephthalate).

In the case where the electric device is the capacitor for alternating current, it is preferable to use a film of synthetic resin with a small dielectric loss, and when 1,2-EDE or 1,2-CPE of the present invention is combined in use with such a synthetic resin film, polyolefin films and polyester films are preferable, and particularly polypropylene film is more preferable.

On the other hand, in the case where the electric device is the capacitor for direct currrent, the dielectric tangent of the film may be negligible and accordingly, polyolefin films and polyester film, as well as polyvinylidene fluoride film are preferable.

The thickness of the above-mentioned film of synthetic resin varies depending upon the electric device containing the film and, therefore, not restricted; but it is usually in a range of 6 micrometers to 100 micrometers. The insulating paper used together with the film of synthetic resin is ordinary insulating paper used as an insulating paper.

The oil-impregnated electric devices of the present invention include, for instance, capacitors, cables, transformers.

The present invention will be further explained by way of the following non-limitative examples:

EXAMPLE 1

Capacitor elements of paper-film type with a capacity of 12 μF were prepared by laying a sheet of insulating paper 18 micrometers in thickness and 0.80 g/cm² in density between 2 sheets of polypropylene film 18 micrometers in thickness, piling the insulating sheet with two electrode-conductors and winding the whole.

Another capacitor elements of all-film type with a capacity of 10 μF were prepared from two sheets of polypropylene film 18 micrometers in thickness. Into each of the capacitor device housings, each of the two types of the above-mentioned capacitor elements, each of 1,2-EDE, 1,2-CPE and 1,1-PXE (comparative example) was filled up. The dielectric constant ($\epsilon$) at 20° C., applied voltage stress (G, V/micrometer) and energy density ($\epsilon G^2$) of the thus-prepared capacitor elements were measured. The results thus obtained are shown in Table 4.

TABLE 4

| | Properties of Capacitors | | | |
|---|---|---|---|---|
| Insulating oil | Dielectric material | Dielectric constant ($\epsilon$) | Applied voltage stress G (V/μm) | Energy density ($\epsilon G^2$) |
| 1,2-EDE | paper-film | 2.67 | 40 | 4272 |
| | all film | 2.25 | 42 | 3969 |
| 1,2-CPE | paper-film | 2.67 | 40 | 4272 |
| | all film | 2.25 | 42 | 3969 |
| 1,1-PXE | paper-film | 2.67 | 38 | 3855 |
| | all film | 2.25 | 37 | 3080 |

As are seen in Table 4, the capacitor impregnated with 1,2-EDE or 1,2-CPE has a larger energy density than that impregnated with 1,1-PXE. Since in the capacitor elements of the same capacity, the volume of the capacitor is inversely proportional to its energy density, the capacitor impregnated with 1,2-EDE or 1,2-CPE can be more miniaturized than that impregnated with 1,1-PXE.

The partial discharge inception voltage of the above-mentioned capacitor elements are shown in Table 5.

TABLE 5

| | Partial discharge inception voltage | | | |
|---|---|---|---|---|
| | | unit: V/micrometer Partial discharge inception voltage | | |
| Insulating oil | Dielectric material | at −40° C. | at 20° C. | at 80° C. |
| 1,2-EDE | paper-film | 65 | 90 | 120 |
| | all film | 70 | 100 | 130 |
| 1,2-CPE | paper-film | 65 | 90 | 120 |
| | all film | 70 | 100 | 130 |
| 1,1-PXE | paper-film | 50 | 88 | 110 |
| | all film | 47 | 93 | 110 |

As is seen in Table 5, the partial discharge inception voltage of the capacitors impregnated with 1,2-EDE or 1,2-CPE are higher than that impregnated with 1,1-PXE. In other words, the capacitor impregnated with 1,2-EDE or 1,2-CPE can withstand a higher voltage than the capacitor impregnated with 1,1-PXE. As is seen, this tendency is remarkable at a lower temperature. These results are based on (1) the lower viscosity of 1,2-EDE and 1,2-CPE than that of 1,1-PXE resulting in the easier impregnation of the capacitor with the insulating oil, (2) the low viscosity of 1,2-EDE and 1,2-CPE even at a low temperature resulting in the easier penetration of the insulating oil between the layers of films, as shown in Table 1, and (3) the lower solubility of polypropylene film into 1,2-EDE and 1,2-CPE and the lower swelling of polypropylene film in these 1,2-diarylethane-type insulating oils than in 1,1-diarylethane-type insulating oil as shown in Table 2.

Then, an alternating voltage of 2 times as high as the rated voltage was applied to each group of the above-mentioned capacitors at an ambient temperature of 90° C. successively for 100 days. After the successive application for 100 days, the number of extant capacitor elements was enumerated to calculate the survival rate, and the dielectric loss of the extant capacitor element without breakdown was measured. The results are shown in Table 6.

In all the capacitor elements, solder was used for internal connections. As is seen in Table 6, the value of dielectric loss of each oil-impregnated capacitor element before the application was substantially the same regardless of the insulating oil. However, after beginning the application, while the dielectric loss of the capacitor impregnated with the 1,2-type insulating oil showed a decreasing tendency, the dielectric loss of the capacitor impregnated with the 1,1-type insulating oil showed an increase and the value reached about 2 times of the value of the capacitor impregnated with the 1,2-type insulating oil. The reason of such a large increase of dielectric loss is attributed to the effect of solder used in the wiring within the capacitor.

The reason of the lower survival rate of the capacitors impregnated with 1,1-PXE, 1,1-EDE or 1,1-CPE than those impregnated with 1,2-EDE or 1,2-CPE is due to the thermal breakdown accompanying the increase of the dielectric loss. The smaller dielectric loss means the smaller heat evolution of the electric insulating elements. Also from the view point of economization of electric power, the 1,2-type diarylethane is far more desirable than the 1,1-type diarylethane.

In order to examine the property of withstanding high voltage of the thus-prepared capacitor elements at a low temperature, each group of the capacitor elements was applied with alternating voltage of 2 times of the rated voltage at an ambient temperature of −40° C. continuously for 50 days, and the survival rate of the capacitor element was investigated. The results are shown in Table 7.

TABLE 6

| | Survival Rate and Dielectric loss before and after heat treatment | | | | | |
|---|---|---|---|---|---|---|
| Insulating material | Thermal properties | Insulating oil | | | | |
| | | 1,2-EDE | 1,2-CPE | 1,1-PXE | 1,1-EDE | 1,1-CPE |
| paper-film | Rate of survival | 100 | 100 | 60 | 60 | 60 |
| all film | after 100 days (%) | 100 | 100 | 80 | 80 | 80 |

TABLE 6-continued

Survival Rate and Dielectric loss before and after heat treatment

| Insulating material | Thermal properties | Insulating oil | | | | |
|---|---|---|---|---|---|---|
| | | 1,2-EDE | 1,2-CPE | 1,1-PXE | 1,1-EDE | 1,1-CPE |
| paper-film | Dielectric loss | | | | | |
| | Initial | 0.050 | 0.050 | 0.050 | 0.050 | 0.050 |
| | After 100 days | 0.045 | 0.045 | 0.082 | 0.083 | 0.082 |
| all film | Initial | 0.031 | 0.031 | 0.032 | 0.031 | 0.031 |
| | After 100 days | 0.028 | 0.028 | 0.057 | 0.055 | 0.054 |

TABLE 7

Effect of Low Temperature on Property of Withstanding High Voltage Rate of Survival (%)

| | Insulating material | Insulating oil | | | |
|---|---|---|---|---|---|
| | | 1,2-EDE | 1,2-CPE | 1,1-PXE | 1,1-EDE |
| Rate of survival (%) | paper-film | 100 | 100 | 60 | 80 |
| | all film | 100 | 100 | 40 | 70 |

Incidentally, viscosity of 1,1-EDE at various temperatures is as follows: 4.1 cst at 30° C., 10.5 cst at 0° C., 41 cst at −20° C. and 220 cst at −40° C.

The reason of higher survival rates of capacitors impregnated with 1,2-EDE or 1,2-CPE than those impregnated with 1,1-PXE or 1,1-EDE is due to the easier circulation of 1,2-EDE or 1,2-CPE between the layers of films of the capacitor owing to the lower viscosity of 1,2-EDE and 1,2-CPE at low temperature than that of 1,1-PXE and 1,1-EDE, thus resulting in the more favorable property of withstanding higher voltage in the case of the capacitors impregnated with 1,2-EDE or 1,2-CPE.

Figure 2:
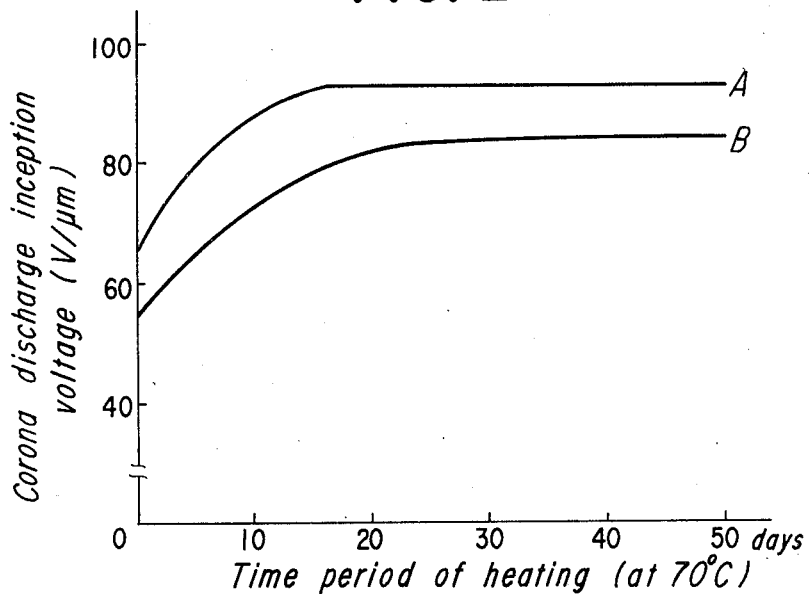
FIG. 2 shows the same relationship in the paper-film type condenser impregnated with each of the above-mentioned insulating agents, respectively.

In order to examine the thermal stability of capacitors impregnated with various insulating oils, respectively, the above-mentioned capacitor elements were kept at a temperature of 70° C. and the partial discharge inception voltage of the capacitor elements was measured at a pre-determined time period of heating. FIG. 1 shows the change of the above-mentioned voltage in the capacitor elements of all-film type as the heating time passed by, and FIG. 2 shows the same relationship, in the capacitors of paper-film type. In both Figures, Line A shows the relationship in the capacitor element impregnated with 1,2-EDE or 1,2-CPE, and Line B shows the relationship in the capacitor element impregnated with 1,1-PXE.

As are seen in FIGS. 1 and 2, in the capacitor impregnated with 1,2-EDE or 1,2-CPE, the time taken to reach the saturated partial discharge inception voltage is shorter than that in the case of the capacitor impregnated with 1,1-PXE. This phenomenon is interpreted to be due to the better impregnatability of the insulating oil such as 1,2-EDE and 1,2-CPE having lower viscosity than that of the insulating oil such as 1,1-PXE having higher viscosity.

As has been explained above, by the use of 1,2-EDE or 1,2-CPE, miniaturized capacitor is available as the result of increased energy density. The thus-obtained miniaturized capacitors are excellent in withstanding high voltage in broader region of ambient temperature for long time period of usage with reliability.

In addition, the above-mentioned capacitors are not only useful for alternating current but also useful for direct current.

EXAMPLE 2

This example shows oil-filled (OF) cables impregnated with the insulating oil according to the present invention, for instance, 1,2-EDE or 1,2-CPE.

Ten pieces of cable for electric power 2 m in length insulated by a layer of polypropylene film and insulating paper were respectively immersed into each of the following insulating oils, and then they were applied continuously with an alternating voltage of 1.5 times as high as the rated voltage. After 100 day-application, the number of the cable not broken-down and the dielectric loss of the cable not broken-down were examined. The results are shown in Table 8.

TABLE 8

| Property | Insulating oil | | | | |
|---|---|---|---|---|---|
| | 1,2-EDE | 1,2-CPE | 1,1-PXE | 1,1-EDE | Alkylbenzene[1] |
| Rate of survival (%) | 100 | 100 | 70 | 70 | 40 |
| Dielectric loss tan δ (%) | 0.07 | 0.07 | 0.18 | 0.18 | 0.07 |

Note:
[1]Alkylbenzene corresponds to the insulating oil No. 2-1 prescribed in Japanese Industrial Standards C-2320/1978.

As is seen in Table 8, the survival rate of the cables impregnated with 1,2-EDE or 1,2-CPE was higher than that of the cables impregnated with 1,1-PXE, 1,1-EDE or alkylbenzene. The higher survival rate of the capacitor means a high dielectric strength and absence of thermal breakdown of the capacitor due to high dielectric loss.

Such improved properties come from (1) lower viscosity of 1,2-EDE or 1,2-CPE (2) lower swelling and dissolution of polypropylene film in 1,2-EDE or 1,2-CPE, and (3) favorable affinity of 1,2-EDE or 1,2-CPE to copper and solder used as the conductor or fittings of the cable.

In short, in the case of applying 1,2-EDE or 1,2-CPE to cables for electric power supply, the cables excellent in properties of withstanding high voltages and dielectric property can be obtained.

EXAMPLE 3

Three kinds of paper-film type capacitor were prepared. Each dielectric element consists of 2 sheets of synthetic resin film (18 micrometers thick) and one sheet of insulatng paper (12 micrometers thick) inserted between them. The synthetic resins used herein were polypropylene, polyester and polyvinylidene fluoride.

Separately, one kind of all film-type capacitor was prepared. The dielectric element thereof consists of 2 sheets of polyvinylidene fluoride films.

The capacitors thus obtained were impregnated with 1,2-EDE, 1,2-CPE or 1,1-PXE, respectively.

Dielectric constant (ε), applied voltage stress and (G) energy density (ε $G^2$) at 20° C. of the thus-prepared capacitors were measured and shown in Table 9. In Table 9, the applied voltage stress is the value after discharging for $10^4$ times a direct voltage of non-oscillation type.

TABLE 9

| | | Properties of Capacitor | | |
|---|---|---|---|---|
| Insulating oil | Insulating material | Dielectric constant ($\epsilon$) | Applied voltage stress [G(v/$\mu$m)] | Energy density ($\epsilon G^2$) × $10^4$ |
| | Paper film type | | | |
| | Film | | | |
| 1,2-EDE | Polypropylene | 3.0 | 240 | 17.8 |
| | Polyester | 3.4 | 240 | 19.6 |
| | Poly-VDF[1] | 6.9 | 230 | 36.5 |
| 1,2-CPE | Polypropylene | 3.0 | 240 | 17.3 |
| | Polyester | 3.4 | 240 | 19.6 |
| | Poly-VDF[1] | 6.9 | 230 | 36.5 |
| 1,1-PXE | Polypropylene | 3.0 | 210 | 13.2 |
| | Polyester | 3.4 | 210 | 15.0 |
| | Poly-VDF[1] | 6.9 | 205 | 29.0 |
| | All film type | | | |
| 1,2-EDE | Poly-VDF | 10 | 190 | 361 |
| 1,2-CPE | Poly-VDF | 10 | 190 | 361 |
| 1,1-PXE | Poly-VDF | 10 | 150 | 225 |

Note:
[1] Poly-VDF means Polyvinylidene fluoride

In addition, the bio-degradability of 1,2-EDE and 1,2-CPE was determined by standard method as follows:

By using the activated sludge prescribed by the Association of Examination of Chemicals and Chemical Products (Kagakuhin Kensa Kyokai of Japan), a culture medium containing the activated sludge and 200 ppm of 1,2-EDE or 1,2-CPE was cultured in a flask by shaking method, and after 14 days of cultivation, the specimen in the culture medium was determined by gas chromatography. The 1,2-EDE or 1,2-CPE was not detected in the culture medium, and the excellent bio-degradability of 1,2-EDE and 1,2-CPE was confirmed.

What is claimed is:

1. An oil-impregnated electric device containing as its component an electric element selected from the group consisting of capacitors, cables, and transformers comprising a film of synthetic resin selected from the group consisting of polyolefins, polyesters, and polyvinylidene fluoride, wherein said electric element comprising a synthetic resin film is impregnated with an insulating oil selected from 1-phenyl-2-ethylphenylethane, 1-phenyl-2-isopropylphenylethane and mixtures thereof.

2. The electric device according to claim 1, wherein said electric element consists of a synthetic resin film.

3. The electric device according to claim 1, wherein said electric element consists of a synthetic resin film and an insulating paper.

4. The electric device according to any one of claims 1 to 3, wherein said electric element is a capacitor element for alternating current and comprises film(s) of a synthetic resin selected from polyolefins and polyesters.

5. The electric device according to any one of claims 1 to 3, wherein said electric element is capacitor element for direct current and comprises film(s) of a synthetic resin selected from polyolefins, polyesters and polyvinylidene fluoride.

6. The electric device according to claim 3, wherein said electric element is an oil-filled cable element and comprises a polyolefin film and an insulating paper.

7. The electric device according to any one of claims 1 to 3, wherein said synthetic resin film is a polyolefin film.

8. The electric device according to any one of claims 1 to 3, wherein said synthetic resin film is a polypropylene film.

9. The electric device according to claim 4, wherein said polyester is poly(ethylene terephthalate).

10. The electric device according to claim 5, wherein said polyester is poly(ethylene terephthalate).

* * * * *